(12) United States Patent
Makisalo (10) Patent No.: US 9,744,993 B2
(45) Date of Patent: Aug. 29, 2017

(54) STEERING MECHANISM FOR TRANSPORT EQUIPMENT (71) Applicant: SANDVIK MINING AND CONSTRUCTION OY, Tampere (FI)

(72) Inventor: Kari Makisalo, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 0 days.

(21) Appl. No.: 15/112,882

(22) PCT Filed: Jan. 22, 2014

(86) PCT No.: PCT/FI2014/050049
§ 371 (c)(1),
(2) Date: Jul. 20, 2016

(87) PCT Pub. No.: WO2015/110690
PCT Pub. Date: Jul. 30, 2015

(65) Prior Publication Data
US 2016/0339954 A1  Nov. 24, 2016

(51) Int. Cl.
*B62D 7/18* (2006.01)
*B62D 7/06* (2006.01)
(Continued)

(52) U.S. Cl.
CPC .............. *B62D 7/18* (2013.01); *B60G 3/28* (2013.01); *B62D 7/06* (2013.01); *B62D 9/00* (2013.01); *B62D 12/00* (2013.01); *B62D 13/04* (2013.01)

(58) Field of Classification Search
CPC .......... B62D 7/18; B62D 12/00; B62D 13/04; B62D 9/00; B62D 7/06; B60G 3/28
See application file for complete search history.

(56) References Cited

U.S. PATENT DOCUMENTS 1,385,361 A * 7/1921 Clement ............... B62D 13/04
   280/445
2,733,932 A * 2/1956 Stidham ............... B62D 13/04
   280/103

(Continued)

FOREIGN PATENT DOCUMENTS

DE  3737817 A1  5/1989
EP  0700821 A1  3/1996
(Continued)

*Primary Examiner* — Drew J Brown
(74) *Attorney, Agent, or Firm* — Corinne R. Gorski (57) ABSTRACT

A steering mechanism intended for use in transport equipment, such as a truck, or a trailer, includes a steering knuckle on both sides of a body of the transport equipment. A king pin is fastened by articulation to the steering knuckles and a wheel of the transport equipment is fastened to each king pins. the steering knuckles being fastened by articulation to the body. The king pins are pivotable with respect to the steering knuckle to which they are fastened. The steering knuckles are pivotable so that when either of the steering knuckles pivots about the respective articulation arranged in the body, the king pin in the pivoting knuckle simultaneously remains un-pivoted with respect to the steering knuckle to which it is fastened. The other steering knuckle simultaneously remains un-pivoted and the king pin therein thus pivots with respect to the steering knuckle to which it is fastened.

17 Claims, 6 Drawing Sheets

(51) Int. Cl.
*B62D 9/00* (2006.01)
*B60G 3/28* (2006.01)
*B62D 12/00* (2006.01)
*B62D 13/04* (2006.01)

(56) References Cited

U.S. PATENT DOCUMENTS

| | | | | |
|---|---|---|---|---|
| 6,158,759 | A * | 12/2000 | Perry | B62D 13/04 |
| | | | | 280/444 |
| 8,376,078 | B2 * | 2/2013 | Hiddema | A01C 23/008 |
| | | | | 180/209 |
| 2004/0080134 | A1 | 4/2004 | Sap et al. | |
| 2016/0332666 | A1* | 11/2016 | Manion | B62D 7/1509 |

FOREIGN PATENT DOCUMENTS

| | | |
|---|---|---|
| EP | 2196380 A1 | 6/2010 |
| FI | 124208 B | 5/2014 |
| JP | 2010052584 A | 3/2010 |
| WO | 2010020608 A1 | 2/2010 |

* cited by examiner

STEERING MECHANISM FOR TRANSPORT EQUIPMENT

RELATED APPLICATION DATA

This application is a §371 National Stage Application of PCT International Application No. PCT/FI2014/050049 filed Jan. 22, 2014.

FIELD OF THE INVENTION

The invention relates to a steering mechanism for transport equipment, which steering mechanism can be used, for example, in a truck or in a trailer of a truck.

BACKGROUND OF THE INVENTION

In transport equipment, such as for example trucks or their trailers, various steering mechanisms are used for enabling their steering.

One steering solution for transport equipment is presented in publication FI20105178.

The publication presents a transport equipment body provided with a plurality of wheels, of which at least one is a drive wheel, and a transport equipment centre articulation which divides the body of the transport equipment into a front body part and a rear body part such that the transport equipment further comprises a trailer connectable to the body of the transport equipment by a fastening articulation. Furthermore, a trailer comprises a trailer body, a trailer transport box, and a plurality of wheels, of which at least two wheels are arranged to be steerable wheels.

Another steering mechanism for transport equipment is presented in publication EP0700821. The publication presents a solution, in which the steering of the transport equipment (tractor) is implemented so that the front body of the transport equipment is provided with a steerable axle, pivotable hub pieces comprising a steering knuckle are arranged at the end of the axle, and the wheels of the transport equipment are fitted in the hub pieces.

The solutions of prior art involve the problem that a considerable amount of space is required for turning the wheels of the transport equipment, particularly if the wheels are large, and little space is thus available for the body structures between the wheels. On the other hand, it is not desirable to make the body structures larger/wider, because if the body structures, such as the chassis/chassis structures of the transport equipment, are made e.g. wider, the transport equipment no longer fits for use in limited spaces (such as, for example, mines).

Therefore, the transport equipment should be designed such that it can conveniently move and turn in relatively narrow and even limited spaces.

For examples in mines and underground as well as surface excavation, there is a clear need and demand for novel steering mechanisms for transport equipment which can be used to reduce the space required for turning without having to significantly modify the body structures in order to increase the turning radii of the wheels.

BRIEF SUMMARY OF THE INVENTION

It is an aim of the present invention to provide a novel steering mechanism in order to avoid the problems and drawbacks present in the state of the art.

The steering mechanism according to the invention is characterized in that the steering knuckles in the steering mechanism are fastened by articulation to the body of the transport equipment, and that hub pieces fastened by articulation to the steering knuckles are pivotable with respect to the steering knuckle to which they are fastened, and that the hub pieces are pivotable by means of actuators connected to them, and further that the steering knuckles are pivotable by actuators arranged in them to a desired angle so that for steering the transport equipment when either of the steering knuckles pivots about the respective articulation provided in the body, the hub piece in the pivoting steering knuckle simultaneously remains unpivoted with respect to the steering knuckle to which it is fastened by articulation, wherein simultaneously the other steering knuckle remains unpivoted in its articulation provided in the body, and the hub piece therein thus pivots with respect to the steering knuckle to which it is fastened by articulation.

An improved solution for a steering mechanism for transport equipment is now provided. Some preferred embodiments of the invention are disclosed in the dependent claims.

The present invention provides several advantages, which become more apparent in the detailed description.

By the steering mechanism according to the invention, in spite of the large turning angle of the wheels, space for the body is amply provided between the wheels; in other words, even if the turning angles of the wheels may be large, the wheels still do not require a lot of space. For this reason, there is no need to make the body structures larger (in other words, to modify the body structure in order to make the turning angle of the wheels larger) for increasing the turning angles of the wheels.

BRIEF DESCRIPTION OF THE FIGURES

Some embodiments of the invention will now be described in more detail in connection with some preferred embodiments, with reference to the accompanying drawings 1a to 3b, in which:

FIG. 2b shows a perspective view of the steering mechanism in the situation of FIG. 2a.

FIG. 3b shows a perspective view of the steering mechanism in the situation of FIG. 3a.

DETAILED DESCRIPTION OF AN EMBODIMENT OF THE INVENTION WITH REFERENCE TO THE DRAWINGS

Figure 1A:
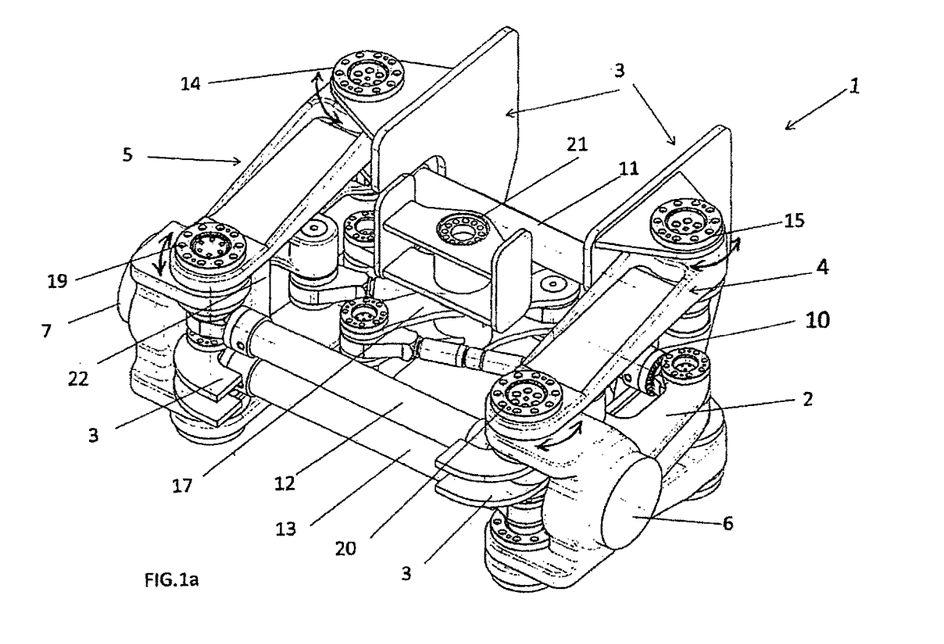
FIG. 1a shows a steering mechanism according to the invention in a perspective view.
Figure 1B:
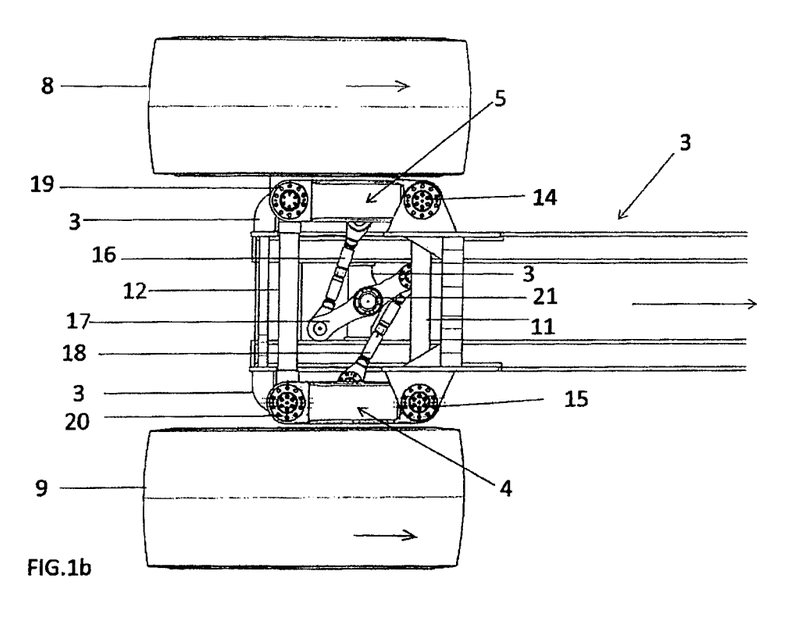
FIG. 1b shows the steering mechanism according to the invention in a top view (when driving straight ahead).

FIG. 1a shows the steering mechanism according to the invention in a perspective view, and in a corresponding manner, FIG. 1b shows the steering mechanism according to the invention in a top view, the steering mechanism being arranged in the body of the transport equipment. FIGS. 1a and 1b illustrate a situation in which the transport equipment is driven straight ahead, but it is obvious that the steering mechanism also works in a situation of reversing, that is, when the travel direction of the transport equipment is initially opposite to that shown by an arrow in FIG. 1a.

As seen in FIG. 1a, the steering mechanism according to the invention, particularly intended for use in transport equipment, such as a truck or a trailer of a truck, comprises at least one steering knuckle 4, 5 on each side of the body 3 of the transport equipment, a hub piece 6, 7 being fastened by articulation to the steering knuckles, and further, wheels 8, 9 of the transport equipment being fastened to the hub pieces in the steering knuckles, as shown in FIG. 1*b*. According to FIG. 1*a*, the steering knuckles 4, 5 are fastened to the body 3 of the transport equipment by means of articulations 14 and 15, and the hub pieces 6, 7 fastened by articulation to the steering knuckles are pivotable to a desired angle with respect to the steering knuckle to which they are fastened; that is, as shown in the figure, the hub piece 6 is pivotable with respect to the steering knuckle 4, and the hub piece 7 is pivotable with respect to the steering knuckle 5, respectively. The rotation of the hub pieces is provided by means of actuators 10, 11, such as hydraulic actuators, connected to them, and in a corresponding manner, the steering knuckles are also pivotable to a desired angle by means of actuators 12, 13 provided in them.

When one of the steering knuckles 4, 5 in the steering mechanism according to the invention, for example the steering knuckle 4, pivots a given angle, the hub piece 6 in the steering knuckle 5 on the opposite side of the body simultaneously pivots the same angle or a different angle with respect to the steering knuckle to which it is fastened by articulation.

According to FIGS. 1*a* and 1*b*, the hub pieces 6, 7 are connected to each other by a set of levers 16, 17 and 18 for controlling the mutual pivoting of the hub pieces when either of the steering knuckles is pivoted. The hub pieces 6, 7 comprise a lever arm or they are provided with a lever arm (or a lever-arm-like shoulder) 2, to which one or more actuators 10, 11 (as well as the set of levers 16 to 18) can be connected to enable the pivoting of the hub piece.

The set of levers 16 to 18 comprises at least three lever arms, one 17 of the lever arms being fastened by an articulation 21 to the body 3, equally spaced from the steering knuckles on the different sides of the body, that is, between the steering knuckles on the different sides. However, the articulation 21 does not necessarily have to be equally spaced from the steering knuckles, but in contrast to the figures it may be closer to one of the two steering knuckles.

As shown in FIGS. 1*a* and 1*b*, the steering knuckles 4, 5 are fastened to the body 3 by substantially vertical articulations 14, 15, and also the hub pieces 6, 7 are fastened to the steering knuckles 4, 5 by substantially vertical articulations 19, 20. However, it is feasible that the articulations of the steering knuckles and the hub pieces are not vertical, in other words that they deviate from the vertical direction.

The actuators 12, 13 driving the steering knuckles 4, 5 can be fastened to each steering knuckle 4, 5 concentrically by that articulation 19, 20 of the hub piece 6, 7 in the steering knuckle, by which the hub piece 6, 7 is fastened to the respective steering knuckle 4, 5. The actuators 10 to 13 are all fastened at one end to the body 3; in other words, they are supported by the body 3.

Also, the actuators 10, 11 for driving the hub pieces 6, 7 can be fastened to the respective steering knuckle 4, 5 concentrically to that articulation 14, 5 in the steering knuckle, by which the steering knuckle 4, 5 is fastened to the body.

Figure 2A:
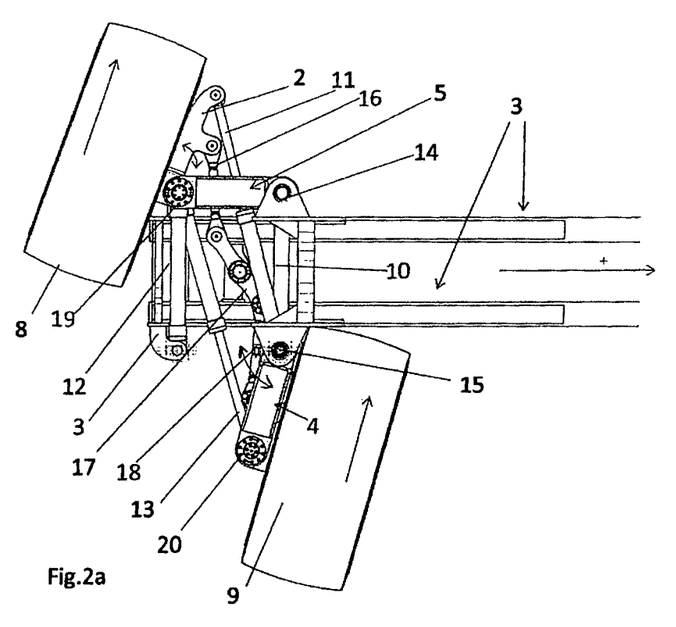
FIG. 2a shows the steering mechanism according to the invention in a top view when turning to the right.

FIG. 2*a* shows the operation of the steering mechanism according to the invention for steering the transport equipment, when the transport equipment is turned to the right (the initial travel direction of the transport equipment as well as the rotation direction of the wheels being indicated with an arrow). As shown in the figure, when one of the steering knuckles, i.e. the steering knuckle 4 on the right hand side of the figure, is pivoted by the actuator 13 about the articulation 14, 15 arranged in the body 3, the hub piece 6 therein, i.e. in the pivoting steering knuckle, remains non-pivoted with respect to the steering knuckle 4 to which it is fastened by articulation, wherein the other steering knuckle 5 simultaneously remains non-pivoted in its articulation 14 arranged in the body 3, and the hub piece 7 therein thus pivots with respect to the steering knuckle 5 to which it is fastened by articulation. Depending on the dimensions of the steering mechanism, the wheels can also be oriented parallel to each other, but there may also be a slight angular difference between them; in other words, they are thus not turned quite in the same direction, as can be seen in the figure.

Figure 2B:
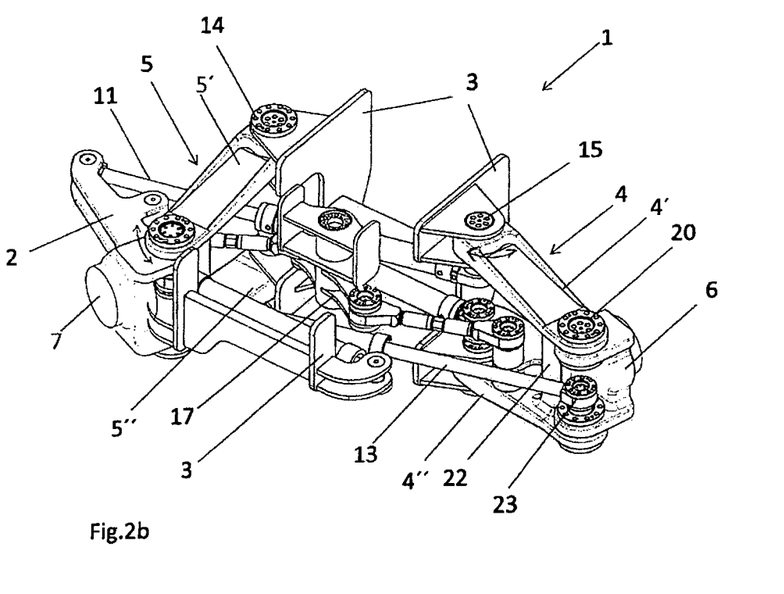

FIG. 2*b* shows the steering mechanism in a perspective view of the situation of FIG. 2*a*, that is, when turning to the right.

As shown in the figure, the steering knuckle 4 on the right hand side is turned outwards from the body 3; in other words, it is turned counter-clockwise, by means of the actuator 13. The steering knuckle 5 on the other side of the body 3 is not pivoted; that is, it is placed against the body 3. However, the hub piece 7 in the steering knuckle is pivoted by the actuator 11.

In the steering mechanism, each steering knuckle 4 or 5, i.e. the one on each side, consists of at least two elongate pieces (4', 4", 5', 5") connected to each other by a connecting part 22. The connecting part can be, for example, welded between the elongate pieces. However, within the scope of the inventive idea it is also possible to contemplate a solution where only one elongate piece, in which the hub piece is fitted, is provided on each side. Members for providing the suspension of the steering knuckle, for example springs, can be fitted between the elongate pieces, but these are not marked in the figures.

Figure 3A:
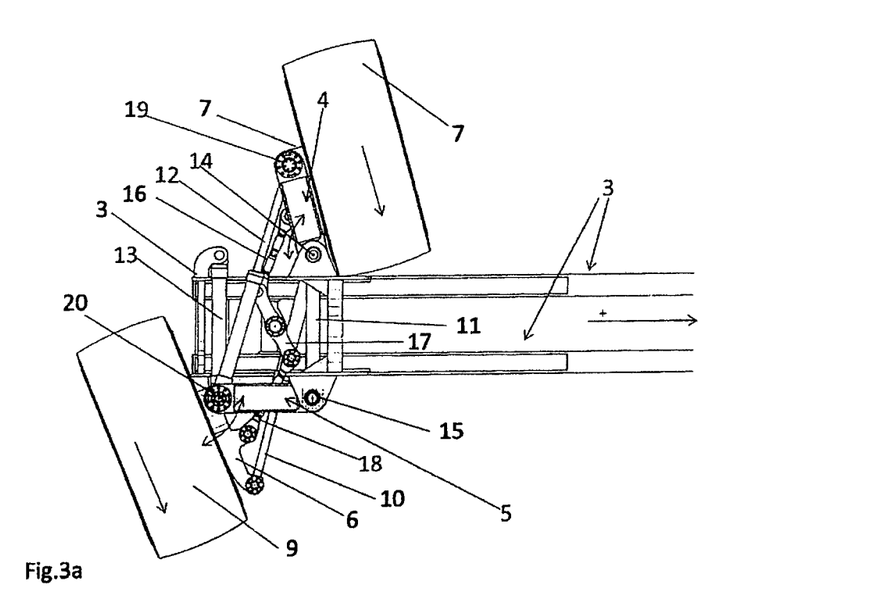
FIG. 3a shows the steering mechanism according to the invention in a top view when turning to the left.

FIG. 3*a* shows the operation of the steering mechanism according to the invention for steering the transport equipment, when the transport equipment is turned to the left (the initial travel direction of the transport equipment as well as the rotation direction of the wheels being indicated with arrows). As shown in the figure, when one of the steering knuckles, i.e. the steering knuckle 5 on the left hand side in the figure, is pivoted by the actuator 12 about the articulation 14 arranged in the body 3, the hub piece 7 therein, i.e. in the pivoting steering knuckle, remains non-pivoted with respect to the steering knuckle 5 to which it is fastened by articulation, wherein the other steering knuckle 4 simultaneously remains non-pivoted in its articulation 15 arranged in the body 3, and the hub piece 6 therein thus pivots with respect to the steering knuckle 4 to which it is fastened by articulation.

Figure 3B:
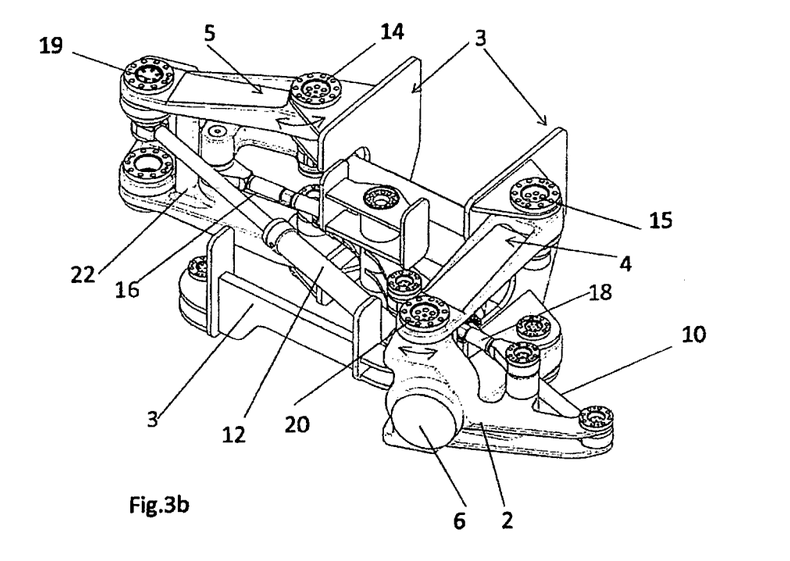

FIG. 3*b* shows the steering mechanism in a perspective view of the situation of FIG. 3*a*, that is, when turning to the left. As shown in the figure, the steering knuckle 5 on the left hand side is turned outwards from the body 3; in other words, it is turned clockwise, by the actuator 12. The steering knuckle 4 on the other side of the body 3 is not pivoted; that is, it is placed against the body 3. However, the hub piece 6 in the steering knuckle is pivoted by the actuator 10.

It will be obvious for a person skilled in the art that with technological developments, the basic idea of the invention can be implemented in many different ways. Thus, the invention and its embodiments are not limited to the above-described examples but they may vary within the scope of the claims. Consequently, various features can be omitted, modified, or replaced with equivalents, and features presented in this application can be combined, to provide various combinations.

The steering mechanism according to the invention can be dimensioned such that when one of the steering knuckles pivots a given angle, the hub piece in the steering knuckle on the other side of the body simultaneously pivots an equal or different angle with respect to the steering knuckle to which it is fastened by articulation.

The steering mechanism according to the invention is advantageously fitted in a mining truck (such as, for example, an articulated mining dumper) or a trailer for the same. The steering mechanism can be fitted in a mining truck (dumper) or in the rear part of a trailer for the same, but it is also feasible that the steering mechanism is fitted in the front part (front body).

Within the scope of the inventive idea it is feasible to implement the steering mechanism so that the actuators are used for controlling both the steering knuckles to pivot simultaneously and that the hub pieces are thus pivoted at the same time.

By dimensioning of the set of levers, i.e. by the length of the lever arms and by selecting their fastening points to the hub piece (the lever arm of the hub piece) and to the body of the transport equipment (the articulation of the middlemost lever arm on the body), it is possible to provide a path for the transport equipment that follows or corresponds to the turning radius of the wheels.

The invention claimed is:

1. A steering mechanism, the steering mechanism being associated with transport equipment, such as a truck or a trailer for a truck, and the steering mechanism comprising:
   at least one steering knuckle located at both sides of a body of the transport equipment;
   a hub piece being fastened by articulation to each at least one steering knuckle, at least one wheel of the transport equipment being fastened to the hub pieces in the steering knuckles, wherein the steering knuckles are fastened by articulation to the body of the transport equipment, and each of the hub pieces fastened by articulation to the steering knuckles are pivotable with respect to the steering knuckle to which it is fastened; and
   an actuator connected to each hub piece, the steering knuckles being pivotable to a desired angle by the actuators arranged in them so that during steering of the transport equipment, when either of the steering knuckles pivots about a respective articulation arranged in the body, the hub piece in the pivoting steering knuckle simultaneously remains unpivoted with respect to the steering knuckle to which it is fastened by articulation, and simultaneously the other steering knuckle remains unpivoted in its articulation arranged in the body, and the hub piece therein is thus pivoted with respect to the steering knuckle to which it is fastened by articulation.

2. The steering mechanism according to claim 1, wherein the hub pieces are connected to each other by a set of levers for controlling the pivoting of the hub pieces with respect to each other.

3. The steering mechanism according to claim 1, wherein the steering knuckles are pivotable outwards from the body such that the articulation by which the respective hub piece is fastened to the steering knuckle recedes from the body.

4. The steering mechanism according to claim 2, wherein the hub pieces comprise a lever arm or are provided with a lever arm to which at least one actuator or set of levers are fastened.

5. The steering mechanism according to claim 1, wherein the steering knuckles are fastened to the body by substantially vertical articulations.

6. The steering mechanism according to claim 1, wherein the hub pieces are fastened to the steering knuckles by substantially vertical articulations.

7. The steering mechanism according to claim 1, wherein the actuators for driving the steering knuckles are fastened to each steering knuckle concentrically with that articulation of the hub piece in the steering knuckle, by which the hub piece is fastened to the steering knuckle.

8. The steering mechanism according to claim 1, wherein the actuators for driving the hub pieces are fastened to each steering knuckle concentrically with that articulation in the steering knuckle, by which the steering knuckle is fastened to body.

9. The steering mechanism according to claim 1, wherein the steering knuckles are pivotable to an angle of 0 to 90° about their respective articulation.

10. The steering mechanism according to claim 2, wherein the set of levers includes at least three lever arms, one of the lever arms being fastened by an articulation in a middle of the steering knuckle at different sides of the body.

11. The steering mechanism according to claim 1, wherein the actuators are hydraulic cylinders.

12. The steering mechanism according to claim 1, wherein when one of the steering knuckles pivots at a given angle, the hub piece in the steering knuckle on the other side of the body simultaneously pivots an equal or different angle with respect to the steering knuckle to which it is fastened by articulation.

13. The steering mechanism according to claim 1, wherein each steering knuckle includes at least two elongate pieces connected to each other by a connecting part.

14. The steering mechanism according to claim 13, further comprising spring members for providing suspension of the steering knuckle provided between the elongate pieces.

15. The steering mechanism according to claim 1, wherein the steering mechanism is fitted in a mining truck dumper or a trailer for the same.

16. The steering mechanism according to claim 1, wherein the steering mechanism is fitted in a mining truck dumper or the rear part of a trailer for the same.

17. The steering mechanism according to claim 1, wherein the steering mechanism is fitted in an articulated mining truck dumper or a trailer for the same.

* * * * *